June 20, 1961 H. KLAUE 2,989,149
DISC BRAKES AND CLUTCHES
Filed Jan. 28, 1958 2 Sheets-Sheet 1
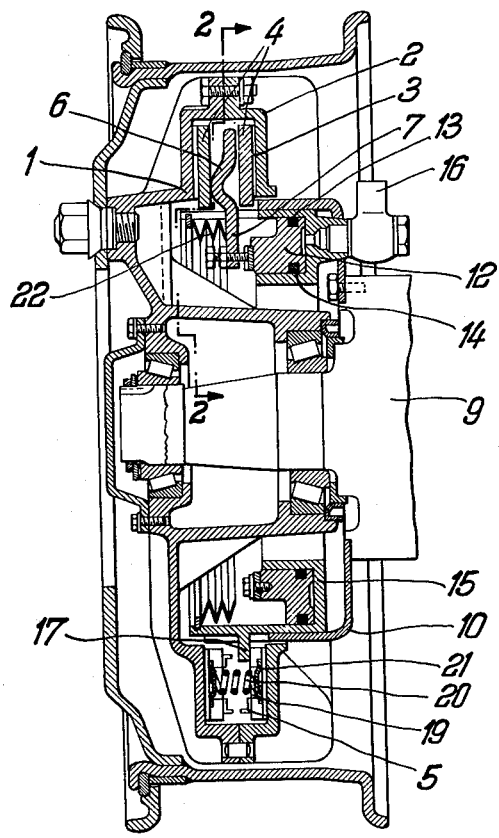
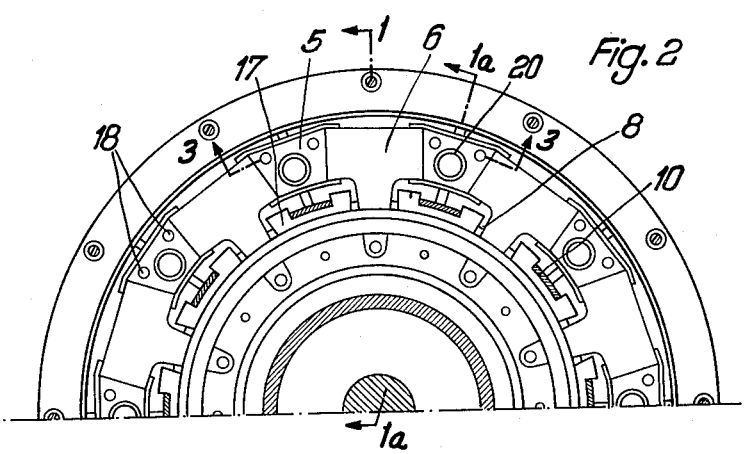
Inventor:
HERMANN KLAUE
By Ostrolenk, Faber,
Gerb & Soffen
ATTORNEYS June 20, 1961 H. KLAUE 2,989,149
DISC BRAKES AND CLUTCHES
Filed Jan. 28, 1958 2 Sheets-Sheet 2
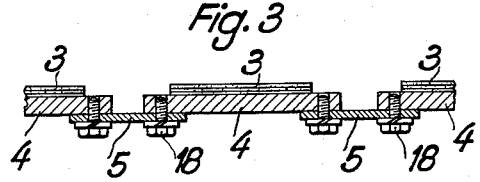
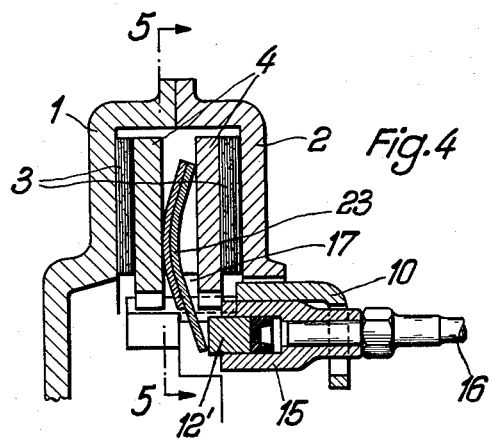
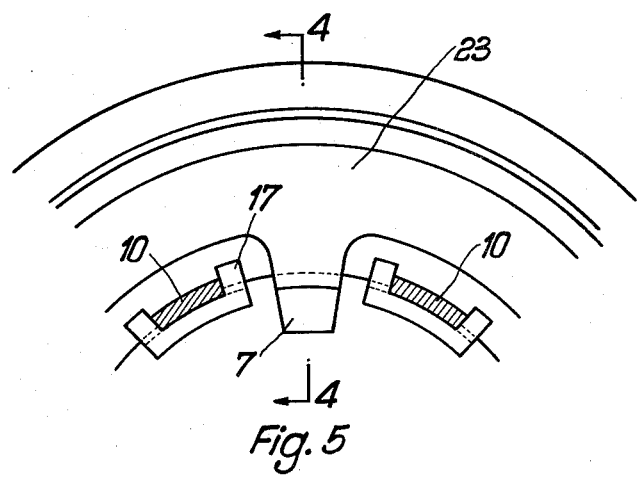
Inventor:
HERMANN KLAUE
By Ostrolenk, Faber,
Gerb & Soffen
ATTORNEYS

United States Patent Office 2,989,149
Patented June 20, 1961

2,989,149
DISC BRAKES AND CLUTCHES
Hermann Klaue, Uberlingen (Bodensee), Germany
Filed Jan. 28, 1958, Ser. No. 711,644
Claims priority, application Germany Oct. 30, 1957
7 Claims. (Cl. 188—72)

The invention relates to a disc clutch or brake comprising a clutch or brake unit disposed in a rotating casing, said unit comprising two discs which are free to move axially and which have a friction lining, a hydraulically or pneumatically operated expanding device being disposed between the said discs and serving to press the discs axially against the casing of the clutch or brake.

It is an object of the invention so to develop disc clutches or brakes of the kind specified that the same are simpler and cheaper to manufacture than heretofore and that the clutch or brake unit is simpler to assemble.

To this end, according to the invention the clutch or brake discs are mounted on the outside of a cylinder which is rigidly connected to the stationary shaft of the clutch or brake and which is dish-shaped and which is formed with elongated recesses to receive the torque and to provide axial guidance of the said discs, an annular hydraulically or pneumatically operated device for actuating the expanding levers of the clutch or brake discs being disposed, separately from the latter, on the inside of the said cylinder.

The expanding levers and the projection of the annular cylinder of the expanding lever actuating device, which projection serves to bear the said discs, extend through the elongated recesses in the guide and supporting cylinder. In the case of clutches or brakes of the kind specified which are subjected to considerable heating, the clutch or brake discs will be so divided into segments interconnected by thin-walled sheet strip secured by screwing that each axially opposite segment pair is allocated to the same expanding lever which is preferably vane-shaped in the part remote from the actuating device. The sheet metal strips are formed as supports for the disc segment return springs.

In the case of clutches or brakes not subject to considerable heating, it is proposed, for the sake of simplifying manufacture, to combine the expanding levers to form a closed annular spring cup comprising extensions which extend towards the cup center and through the same elongated recesses.

Using the disc clutch or disc brake according to the invention, manufacture is simplified and cheapened and the clutch or brake unit is easier to assemble; also, the braking heat produced in operation is kept away from the hydraulic or pneumatic actuating device and the clutch or brake disc bearer can be a low-cost lightweight sheet metal construction.

Two embodiments of the invention are illustrated by way of example in the accompanying drawings in which:

FIG. 1 is a sectional view through the axis of a disc brake fitted to the front wheel of a motor vehicle; the bottom portion of the section is taken through line 1a—1a of FIGURE 2, looking in the direction of arrows 1a—1a, while the top portion of the section is taken through line 1—1 of FIGURE 2 looking in the direction of arrows 1—1;

FIG. 2 is a part-sectional view, vertical to the brake axis, taken along the chain-dotted line 2—2 of FIG. 1 looking in the direction of the arrows;

FIG. 3 is a sectional view taken along the line 3—3 of FIG. 2 looking in the direction of the arrows;

FIG. 4 is merely a part-sectional view taken through line 4—4 of FIGURE 5 looking in the direction of arrows 4—4. In this example the expanding levers are combined to form a closed annular spring cup; and FIG. 5 is a fragmented sectional view, perpendicular to the brake axis, taken along the line 5—5 of FIG. 4.

A finned wheel hub 1 which also serves as a brake casing is screwed to a brake cover 2 having radial ribs. The parts 1 and 2 are the rotating parts of the brake. Brake disc segments 4 having a brake lining 3 and screwed together through the agency of sheet metal strips 5 are so disposed in the rotating brake casing as to be non-movable peripherally but to be adapted to move axially. Vane-like expanding levers 6 laterally retained internally and externally by projections of the strips 5 are mounted between the brake discs or brake disc segments 4. Extensions 7 of the levers 6 extend through recesses 8 in a cylinder 10 screwed to the stationary shaft of the brake or to the stub axle 9 and are connected by means of adjusting screws 11 to the pneumatic or hydraulic actuating device comprising an annular piston 12 and an annular cylinder 15 which is of U-shaped cross-section. The piston 12 is sealed in the cylinder 15 by circular annular packings 13 and 14. The operating medium is supplied through a pipe 16.

The cylinder 15 is formed with projections 17 extending through the elongated recesses 8 in the cylinder 10. The projections 17 are operatively connected to one of the brake discs for axial movement thereof—i.e., when the brake is operated, the projections 17 bear against a brake disc.

Strips 5, which interconnect each pair of brake disc segments 4 by means of screw 18, are formed with recesses 19 through which extend tension springs 20 as can be seen in FIG. 1. The tension springs 20 are secured by means of retaining elements 21. The cup springs 22 which are merely diagrammatically shown in FIG. 1 serve to return the piston 12 to the inoperative position after the termination of braking.

In the embodiment shown in FIGS. 4 and 5 the actuating device $12^1$, 15 is hydraulically operated. In this example solid brake discs 4 are used and the various thrust levers 6 are replaced by a closed cup spring 23 which is strengthened as can be seen in FIG. 4, by being doubled in the outer part. As can be seen in FIG. 5, the cup spring 23 has extensions 7 which extend towards the cup spring center and which bear against the annular piston $12^1$.

I claim:
1. A friction mechanism of the class described comprising a rotatable casing and a unit disposed within said casing; said unit comprising a first and a second axially movable disk, a cup-shaped cylinder rigidly connected to a stationary shaft of said mechanism, said disks being operatively mounted to said cylinder; a fluid operated actuating device including spread-levers protruding through elongated recesses of said cylinder and disposed between said disks; said recesses being constructed and positioned to receive portions of said disks and cooperate therewith to axially guide the disks and to provide for the take-up of torsion; said actuating device further including an annular cylinder and an annular piston movably disposed within said annular cylinder; said annular piston having said spread-levers operatively connected thereto whereby operation of said annular piston is effective to operate said spread-levers and thereby force said disks in opposite directions against said casing.

2. The mechanism as set forth in claim 1 further including spring means for biasing portions of said levers towards said annular piston.

3. The mechanism as set forth in claim 1 in which the annular cylinder is mounted within the disk-shaped cylinder for support and guidance thereof; said annular cylinder having protrusions extending through said elongated recesses and bracing said disks.

4. A friction mechanism as claimed in claim 1, wherein the discs of said unit comprise segments interconnected by thin-walled sheet metal strips forming supports for return springs for the said segments.

5. A friction mechanism of the class described comprising a rotatable casing and a unit disposed within said casing; said unit comprising a first and a second axially movable disk, a cup-shaped cylinder rigidly connected to a stationary shaft of said mechanism, said disks being operatively mounted to said cylinder; a fluid operated actuating device including spread-levers protruding through elongated recesses of said cylinder and disposed between said disks; said recesses being constructed and positioned to receive portions of said disks and cooperate therewith to axially guide the disks and to provide for the take-up of torsion; said actuating device further including an annular cylinder and an annular piston movably disposed within said annular cylinder; said disks of said unit comprising segments interconnected by thin-walled sheet metal strips so that one axially opposite segment pair is allocated respectively to the same lever, said lever being vane-shaped in the part thereof remote from the means for actuating said levers.

6. A friction mechanism of the class described comprising a rotatable casing and a unit disposed within said casing; said unit comprising a first and a second axially movable disk, a cup-shaped cylinder rigidly connected to a stationary shaft of said mechanism, said disks being operatively mounted to said cylinder; a fluid operated actuating device including spread-levers protruding through elongated recesses of said cylinder and disposed between said disks; said recesses being constructed and positioned to receive portions of said disks and cooperate therewith to axially guide the disks and to provide for the take-up of torsion; said actuating device further including an annular cylinder and an annular piston movably disposed within said annular cylinder; said levers being combined to form a closed annular spring comprising projections which extend towards the spring center through the elongated recesses in the dish-shaped cylinder.

7. A friction mechanism of the class described comprising a unit arranged in a rotating housing; said unit consisting of two disks, provided with friction lining, which are axially displaceable on a pot-shaped body rigidly connected with a stationary shaft; a fluid operated actuating device comprising radially arranged spreading levers mounted between said disks and distributed uniformly on the periphery of the disks; said levers being operatively connected to said annular cylinder annular piston combination for movement thereby; said levers being operatively connected to said disks whereby said movement is effective to press said disks against said housing; said pot-shaped body being provided with elongated recesses having portions of said disks disposed therein; said recesses constructed and positioned for receiving the torque and for the axial guiding of the said disks; said actuating device including an annular cylinder and an annular piston guided by said cylinder; said cylinder arranged on the inner circumference of the pot-shaped body and having radial projections which are also passed through the elongated recesses of the pot-shaped body; said projections resting axially on one of said disks.

References Cited in the file of this patent
UNITED STATES PATENTS

| | | |
|---|---|---|
| 1,927,358 | Brequet | Sept. 19, 1933 |
| 2,073,146 | Gardiner | Mar. 9, 1937 |
| 2,247,298 | Kattwinkel | June 24, 1941 |
| 2,531,696 | Martin | Nov. 28, 1950 |
| 2,682,943 | Root | July 6, 1954 |
| 2,792,919 | Klaue | May 21, 1957 |
| 2,868,335 | Panhard | Jan. 13, 1959 |

FOREIGN PATENTS

| | | |
|---|---|---|
| 1,074,409 | France | Mar. 31, 1954 |
| 1,125,976 | France | Nov. 12, 1956 |
| 803,742 | Germany | Apr. 9, 1951 |